(12) United States Patent
Akiyama et al.

(10) Patent No.: US 11,644,622 B2
(45) Date of Patent: May 9, 2023

(54) REINFORCING SLEEVE, REINFORCING STRUCTURE OF SPLICED PORTION OF OPTICAL FIBER

(71) Applicant: FURUKAWA ELECTRIC CO., LTD., Tokyo (JP)

(72) Inventors: Tomohiro Akiyama, Tokyo (JP); Akio Tanabe, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/578,531

(22) Filed: Jan. 19, 2022

(65) Prior Publication Data
US 2022/0229237 A1  Jul. 21, 2022

(30) Foreign Application Priority Data

Jan. 19, 2021  (JP) .............................. JP2021-006703

(51) Int. Cl.
*G02B 6/255* (2006.01)
*G02B 6/44* (2006.01)
*G02B 6/02* (2006.01)

(52) U.S. Cl.
CPC ......... *G02B 6/2558* (2013.01); *G02B 6/4408* (2013.01); *G02B 6/02395* (2013.01); *G02B 6/4403* (2013.01)

(58) Field of Classification Search
CPC .............. G02B 6/02395; G02B 6/2558; G02B 6/4403; G02B 6/4408
See application file for complete search history.

(56) References Cited

U.S. PATENT DOCUMENTS

| | | | | |
|---|---|---|---|---|
| 5,832,162 A | * | 11/1998 | Sarbell | G02B 6/2558 385/99 |
| 6,437,299 B1 | * | 8/2002 | Watanabe | G02B 6/2558 219/466.1 |
| 6,728,451 B2 | * | 4/2004 | Kordahi | G02B 6/4471 385/100 |

(Continued)

FOREIGN PATENT DOCUMENTS

JP           64-32208 A         2/1989

*Primary Examiner* — Ryan A Lepisto
(74) *Attorney, Agent, or Firm* — Oblon, McClelland, Maier & Neustadt, L.L.P.

(57) ABSTRACT

A reinforcing sleeve is a member for collectively reinforcing spliced portions of a plurality of optical fiber core wires disposed side by side. The reinforcing sleeve includes a heat-shrinkable tube, a heat-meltable member, a tension member, and so on. The heat shrinkable tube is a cylindrical member having an approximately circular cross section. The tension member and the heat-meltable member are inserted into the heat-shrinkable tube. The heat-meltable member is disposed on an upper part of the tension member. Also, an optical fiber dispersion portion is formed on a surface of the tension member on a side of the heat-meltable member in a cross section perpendicular to a longitudinal direction of the reinforcing sleeve. The optical fiber dispersion portion includes an inclined portion that is formed so as to separate away from the heat-meltable member as being closer to an end portion of a width direction in a cross section perpendicular to the longitudinal direction of the tension member.

13 Claims, 13 Drawing Sheets

(56) References Cited

U.S. PATENT DOCUMENTS

| | | | | |
|---|---|---|---|---|
| 7,040,818 B2* | 5/2006 | Sato | ............... | G02B 6/2558 |
| | | | | 385/136 |
| 7,212,718 B2* | 5/2007 | Sato | ............... | G02B 6/2553 |
| | | | | 219/535 |
| 8,408,818 B2* | 4/2013 | Homma | ............ | G02B 6/2558 |
| | | | | 385/99 |
| 9,274,281 B2* | 3/2016 | Kawanishi | ......... | G02B 6/2551 |
| 11,226,449 B2* | 1/2022 | Wada | ............... | G02B 6/2558 |

* cited by examiner

PRIOR ART

PRIOR ART

PRIOR ART

REINFORCING SLEEVE, REINFORCING STRUCTURE OF SPLICED PORTION OF OPTICAL FIBER

TECHNICAL FIELD

The present invention relates to a reinforcing sleeve, and a reinforcing structure of a spliced portion of an optical fiber using the reinforcing sleeve.

BACKGROUND

It is known that a reinforcing sleeve is provided at a fusion spliced portion for reinforcing when fusion splicing optical fiber core wires with each other, for example.

Various types of such reinforcing sleeves have been devised. For example, Patent Document 1 discloses a reinforcing sleeve in which a hot melt adhesive tube and a tension member are inserted into a heat-shrinkable tube.

RELATED ART

Patent Document 1: Japanese Unexamined Patent Application Publication No. 1989-32208 (JP-A-1989-32208)

SUMMARY

Problems to be Solved by the Invention

An optical fiber tape core wire has been used in recent years as an optical fiber for carrying mass quantity of data at high speed. The optical fiber tape core wire includes a plurality of optical fiber core wires that are placed side by side and bonded with each other, and is used to facilitate packaging inside a cable and to simplify operations. In addition to the optical fiber tape core wire including the plurality of optical fiber core wires that are disposed side by side and fixed and bonded over an entire length by resin, an optical fiber ribbon including the plurality of side-by-side optical fiber core wires bonded with each other at intervals in a longitudinal direction has also been used. Such intermittent bonding between optical fiber core wires improves fiber density, reduces transmission loss due to bending, and facilitates making a single core fiber. Hereinafter, the optical fiber tape core wire and the optical fiber ribbon will be collectively referred to as an optical fiber tape for simplification.

FIG. 11A to FIG. 11C show steps for reinforcing a spliced portion of optical fiber tapes using a reinforcing sleeve. First, as shown in FIG. 11A, optical fiber core wires 101 that are disposed facing each other are butted to each other and fusion bonded with each other by discharging electricity from an electrode 103. At this time, a reinforcing sleeve 100 is put aside on a side of one of the optical fiber core wires 101.

Next, as shown in FIG. 11B, the reinforcing sleeve 100 is moved to the spliced portion of the optical fiber core wires 101 (an arrow H in the drawing). Then, as shown in FIG. 11C, the reinforcing sleeve 100 is heated and shrunk so that the reinforcing sleeve 100 and a plurality of the optical fiber core wires 101 are unified as one body, thereby reinforcing the spliced portion of the plurality of optical fiber core wires 101.

FIG. 12A is a cross-sectional view of a state shown in FIG. 11B. As mentioned above, the reinforcing sleeve 100 includes a heat-meltable member 107 and a tension member 109 that are inserted into a heat-shrinkable tube 105. The heat-meltable member 107 is in a cylindrical shape, and the spliced portion of the side-by-side optical fiber core wires 101 is provided so as to pass through the heat-meltable member 107. Outer jackets of the optical fiber core wires 101 that are to be passed through the heat-meltable member 107 are removed before splicing.

FIG. 12B is an ideal schematic view of a structure of the reinforcing sleeve 100 when heated. The heat-shrinkable tube 105 shrinks by heating. Also, the heat-meltable member 107 softens by heat, filling up space inside the heat-shrinkable tube 105 after shrinking, and becomes unified with the plurality of optical fiber core wires 101 and the tension member 109.

Here, an upper surface of the tension member 109 (on a side of the optical fiber core wires 101) is often formed as a plane. It is expected for the plurality of optical fiber core wires 101 to align with the plane of the upper surface of the tension member 109, and to be unified with the tension member 109 and the heat-meltable member 107.

However, in reality, as shown in FIG. 12C, when the heat-shrinkable tube 105 shrinks, the heat-meltable member 107 receives force from its surroundings (arrows I in the drawing), and thus the plurality of optical fiber core wires 101 receive side pressure. As mentioned above, although the optical fiber core wires 101 are expected to align straightly with the plane portion of the upper surface of the tension member 109, the side pressure, particularly in a width direction, disarranges the optical fiber core wires 101. For example, part of the optical fiber core wires 101 move away from the tension member 109 to be gathered around the center.

Such tendency is more noticeable in particular as a distance between the optical fiber core wires 101 (a pitch) decreases or the number of the optical fiber core wires increases. This tendency is also more noticeable when a diameter of an optical fiber bare wire is small, with less rigidity. Also, this tendency is further noticeable in an intermittently-bonded optical fiber ribbon, in which the plurality of optical fiber core wires are bonded at intervals in a longitudinal direction.

If the alignment of the optical fiber core wires 101 is disarranged as above, transmission loss in part of the optical fiber core wires 101 may increase. For this reason, when shrinking the heat-shrinkable tube 105, the optical fiber core wires 101 are expected to be always unified in a fixed form, without disarrangement of the alignment of each of the optical fiber core wires 101.

The present invention was made in response to the above issue, and it is an object of the present invention to provide a reinforcing sleeve and the like that can efficiently reinforce a spliced portion of optical fiber tapes.

Means for Solving Problems

To achieve the above object, a first aspect of the present invention is a reinforcing sleeve for collectively reinforcing spliced portions of a plurality of optical fiber core wires that are disposed side by side. The reinforcing sleeve includes a heat-shrinkable tube, a heat-meltable member, and a tension member. The heat-meltable member and the tension member are inserted into the heat shrinkable tube. The tension member includes an optical fiber dispersion portion formed at least at a part of a longitudinal direction of the tension member on a surface of the tension member on a side of the heat-meltable member. The optical fiber dispersion portion includes an inclined portion that is formed so as to separate away from the heat-meltable member as being closer to an end portion of a width direction in a cross section perpendicular to the longitudinal direction of the tension member. At least a part of the inclined portion includes an angle changing portion at which an angle of inclination changes.

The optical fiber dispersion portion may include a linearly-shaped inclined portion that separates away from the heat-meltable member as being close to the end portion of the width direction in the cross section perpendicular to the longitudinal direction of the tension member.

A flat portion may be formed at a substantially center portion of the width direction of the tension member.

A convex portion protruding upward may be formed at the substantially center portion of the width direction of the tension member.

A groove may be formed on at least a part of the surface of the tension member on the side of the heat-meltable member.

The optical fiber dispersion portion may not be formed in a predetermined range at the substantially center portion of the longitudinal direction of the tension member, and a height position of the tension member on the side of the heat-meltable member at the optical fiber dispersion portion may be higher than a height position of the tension member on the side of the heat-meltable member in the predetermined range at the substantially center portion of the longitudinal direction of the tension member.

The tension member may be plate shaped and elastically deformable so that shrinking force of the heat-shrinkable tube may be able to deform the tension member into a convex shape protruding toward the heat-meltable member.

The tension member may include a first tension member having a plate shape and a second tension member that is disposed on a side of the first tension member that is opposite to the heat-meltable member. The second tension member may be in a protruding shape protruding toward the first tension member.

According to the first aspect of the present invention, the optical fiber dispersion portion is formed on the surface of the tension member on the side of the heat-meltable member in the cross section perpendicular to the longitudinal direction of the tension member. Thus, when the heat-meltable member melts, the optical fiber can be dispersed in the width direction, and this can suppress disarrangement of the optical fiber core wires.

At this time, the angle changing portion at which the angle of inclination changes is formed at least at a part of the inclined portion. This enables to set the appropriate angle of inclination for each predetermined range, which makes it easier to control dispersion force in the width direction.

Furthermore, at least partly forming the linear inclined portion facilitates controlling dispersion force of the optical fiber core wire in the width direction. For example, if the inclined portion is formed of only curves, an inclination at the end portion of the width direction becomes too large. Also, particularly for a curve with a vertically crushed flat shape, only a slight inclined surface can be formed on most of an upper surface thereof. In contrast, forming the linear inclined portion over a predetermined range can form an approximately uniform inclination over a desired range, which facilitates controlling dispersion force in the width direction. As a result, it is possible to suppress an increase or a variation in transmission loss of each optical fiber core wire.

Also, with the flat portion formed at the substantially center portion of the width direction of the tension member, the optical fiber core wires can be stably positioned and disposed without exercising the dispersion force on the optical fiber core wires in proximity of the center portion of the width direction. Also, dispersing the optical fiber core wires on both sides of the width direction toward the both ends can suppress side pressure applied from the optical fiber core wires on both sides to the optical fiber in proximity of the center portion.

In contrast, by forming the convex portion protruding upward at the substantially center portion of the width direction of the tension member, the optical fiber core wires can be separated in the width direction at the substantially center portion of the tension member to be disposed.

Also, by forming the groove on at least a part of the surface of the tension member on the side of the heat-meltable member, the optical fiber core wires can be dispersed by the groove to be disposed.

Also, a height of the predetermined range of the substantially center portion of the longitudinal direction of the tension member is made lower than a height on the end portion of the longitudinal direction. Thus, it is possible to prevent the optical fiber dispersion portion from coming into contact with the glass fiber exposed portion of the optical fiber core wires where resin is removed. This can suppress damages and the like to the glass fibers. Also, the optical fiber dispersion portion is formed on the end portion of the longitudinal direction of the tension member, and thus disarrangement of the optical fiber can be suppressed at such parts.

Also, the tension member is plate shaped, and shrinking force of the heat-shrinkable tube elastically deforms the tension member to be in the shape protruding toward the heat-meltable member. Thus, the tension member having a simple shape can easily form the similar optical fiber dispersion portion.

At this time, by disposing the second tension member at the lower part of the first tension member having the plate shape, the tension member can be deformed along a spacer. This can stabilize the shape of the tension member.

A second aspect of the present invention is a reinforcing structure of a spliced portion of optical fiber using the reinforcing sleeve according to the first aspect of the present invention. The heat-meltable member covers the spliced portion of optical fiber ribbons. Each of the optical fiber ribbons includes a plurality of optical fiber core wires that are placed side by side and bonded to each other at intervals in a longitudinal direction.

Preferably, the number of the plurality of the optical fiber core wires forming each of the optical fiber ribbons is 12 or more.

Preferably, a pitch between the plurality of optical fiber core wires is 200 μm or less.

Preferably, an outer diameter of a glass fiber of each of the plurality of optical fiber core wires is 110 μm or less.

Preferably, an outer diameter of each of the plurality of optical fiber core wire is 200 μm or less.

According to the second aspect of the present invention, the plurality of optical fiber core wires forming each of the optical fiber ribbons are disposed along the optical fiber dispersion portion of the tension member, and this can suppress a variation in transmission loss in each optical fiber core wire.

The above effects are particularly remarkable when the number of the plurality of optical fiber core wires forming the optical fiber ribbon is 12 or more. Also, the above effects are remarkable when the pitch between the plurality of optical fiber core wires is 200 μm or less. Also, the above effects are remarkable when the outer diameter of the glass fiber of the optical fiber core wire is 110 μm or less. Also, the above effects are remarkable when the outer diameter of the optical fiber core wire is 200 μm or less.

Effects of the Invention

The present invention can provide a reinforcing sleeve and the like that can efficiently reinforce a spliced portion of optical fiber tapes.

BRIEF DESCRIPTION OF THE DRAWINGS

FIG. 4A is a cross-sectional view of a reinforcing sleeve 1a.

FIG. 4B is a cross-sectional view of a reinforcing sleeve 1b.

DETAILED DESCRIPTION

First Embodiment

Figure 1:
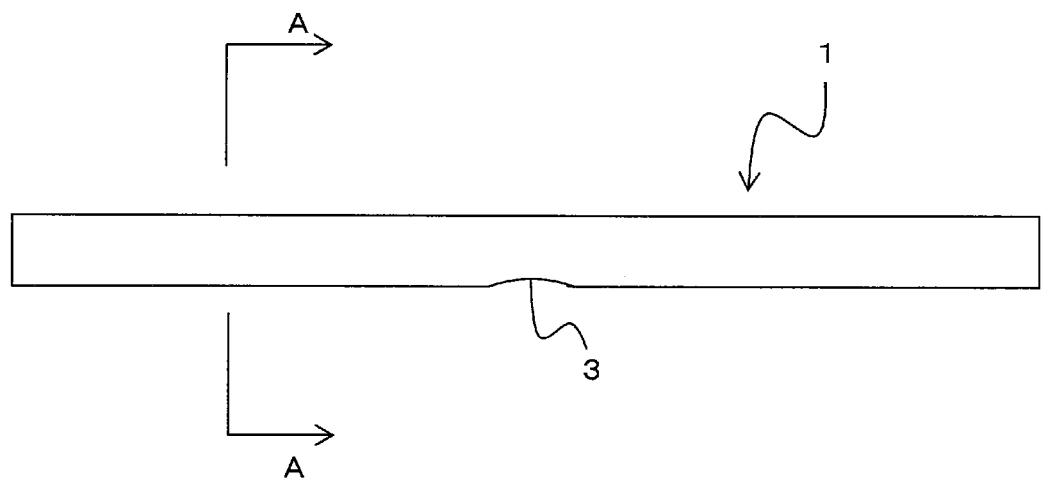
FIG. 1A is a side view showing a reinforcing sleeve 1.
FIG. 1B is a cross-sectional view taken along A-A line in FIG. 1A.
Figure 1:
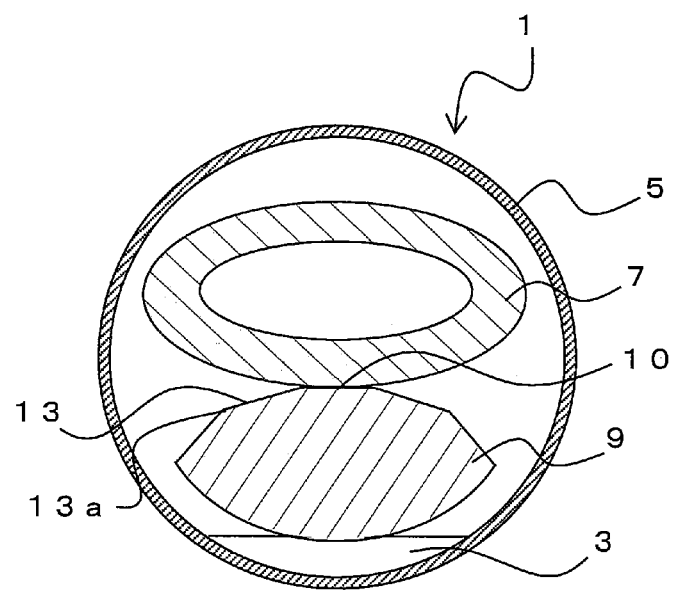

Hereinafter, preferable embodiments of the present invention will be described with reference to the accompanying drawings. FIG. 1A is a side view of a reinforcing sleeve 1, and FIG. 1B is a cross-sectional view taken along A-A line in FIG. 1A. The reinforcing sleeve 1 is a member that collectively reinforces spliced portions of a plurality of optical fiber core wires that are disposed side by side. The reinforcing sleeve 1 includes a heat-shrinkable tube 5, a heat-meltable member 7, a tension member 9, and so on.

The heat-shrinkable tube 5 is a cylindrical member having an approximately circular cross section. The heat-shrinkable tube 5 is made of polyethylene resin, for example.

The heat-meltable member 7 is in a cylindrical shape having an approximately circular or elliptical cross section. The heat-meltable member 7 is made of ethylene-vinyl acetate resin, for example. The heat-meltable member 7 melts preferably at a temperature lower than a heat-shrinking temperature of the heat-shrinkable tube 5.

The tension member 9 is a rod-shaped member. The tension member 9 is made of steel, carbon, glass, or ceramics, for example. The tension member 9 and the heat-meltable member 7 are inserted into the heat-shrinkable tube 5. A rivet-head portion 3 is formed at a part of the heat-shrinkable tube 5 to prevent the tension member 9 and the heat-meltable member 7 from falling.

If the tension member 9 inclines in the cross section, the tension member 9 may shift in relation to a position of the heat-shrinkable tube 5 and this may cause the tension member 9 to lose its balance. In such a case, non-uniform force presses the optical fiber core wires against the tension member 9, which may deteriorate an alignment of the optical fiber core wires. The rivet-head 3, however, prevents the inclination of the tension member 9 and is effective in maintaining the arrangement of the tension member 9 and the optical fiber core wires.

The heat-meltable member 7 is disposed on an upper part of the tension member 9. Also, in a cross section perpendicular to a longitudinal direction of the reinforcing sleeve 1, an optical fiber dispersion portion 13 is formed on a surface of the tension member 9 on a side of the heat-meltable member 7 (an upper part of the drawing). Although details will be described below, the optical fiber dispersion portion 13 may be formed over an entire length of the longitudinal direction of the tension member 9, or may be formed at least at a part thereof. For example, the optical fiber dispersion portion 13 may be formed only at proximity of end portions of the longitudinal direction of the tension member 9 and may not be formed at proximity of a center portion of the longitudinal direction.

The optical fiber dispersion portion 13 is formed of a linearly-shaped inclined portion that separates away from the heat-meltable member 7 as being closer to an end portion of the width direction in the cross section perpendicular to the longitudinal direction of the tension member 9. Also, a flat portion 10 is formed at a substantially center portion of the width direction of the tension member 9. The optical fiber dispersion portion 13, which is formed of a linearly-shaped inclined portion, is formed on each side of the flat portion 10.

As shown in the drawings, it is preferable that the optical fiber dispersion portion 13 is formed of a plurality of steps of linearly-shaped inclined portions with a plurality of different angles. For example, an angle of inclination to the flat portion 10 may increase in multiple steps as moving toward to the end portion of the width direction. That is, preferably, at least a part of the inclined portion includes an angle changing portion 13a where the angle of inclination changes.

Figure 2:
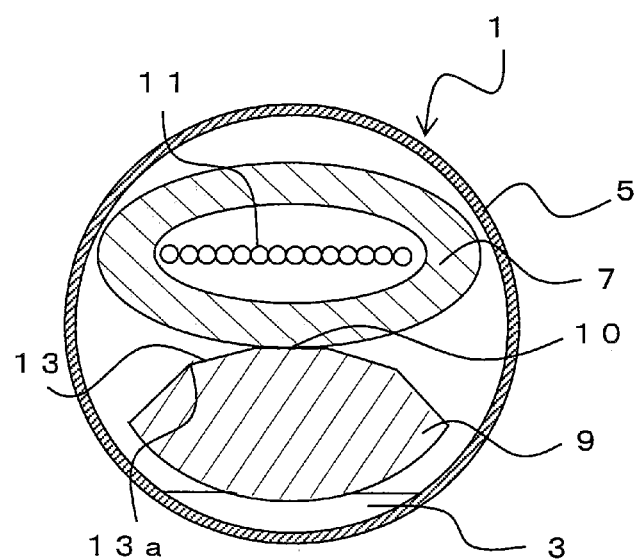
FIG. 2A is a view showing a reinforcing step for a spliced portion between optical fiber core wires 11 using the reinforcing sleeve 1, and is a cross-sectional view before shrinking.
FIG. 2B is a view showing the reinforcing step for the spliced portion between the optical fiber core wires 11 using the reinforcing sleeve 1, and is a cross-sectional view after shrinking.
Figure 2:
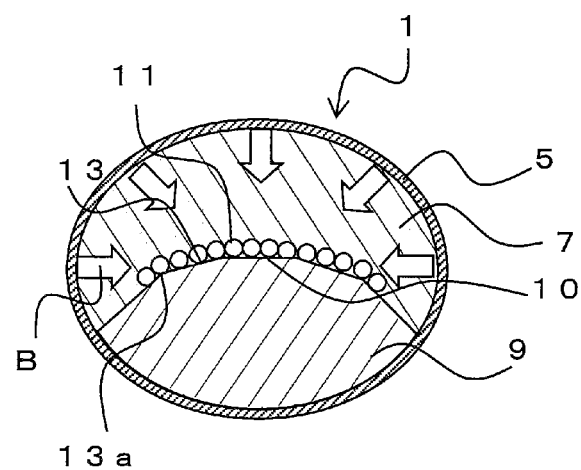
Figure 11:
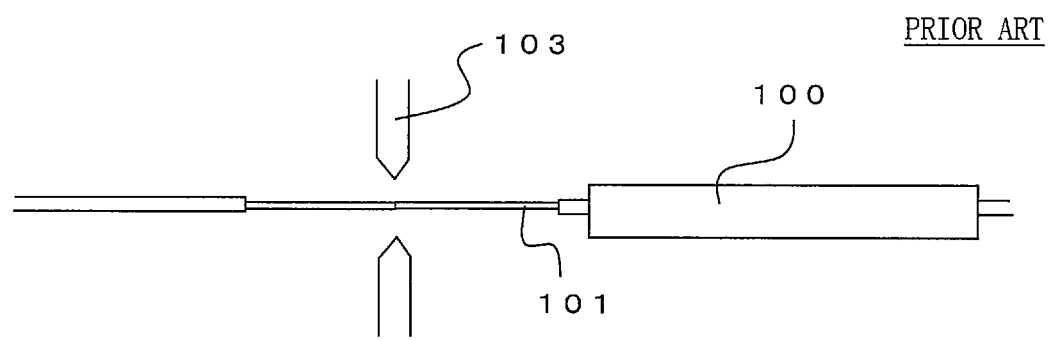
FIG. 11A is a view showing a splicing step of optical fiber core wires 101 using a traditional reinforcing sleeve 100.
FIG. 11B is a view showing the splicing step of the optical fiber core wires 101 using the traditional reinforcing sleeve 100.
FIG. 11C is a view showing the splicing step of the optical fiber core wires 101 using the traditional reinforcing sleeve 100.
Figure 11:
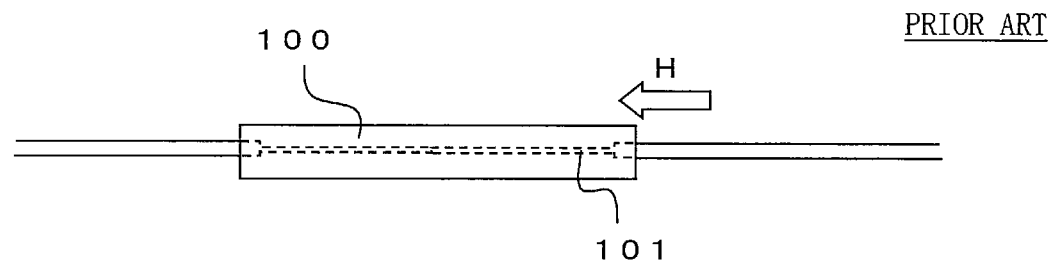
Figure 11:
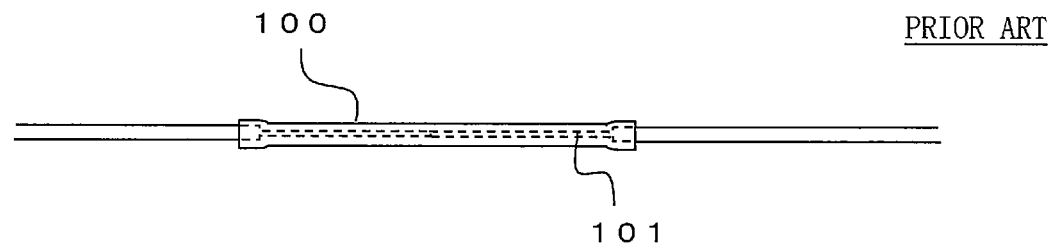
Figure 12:
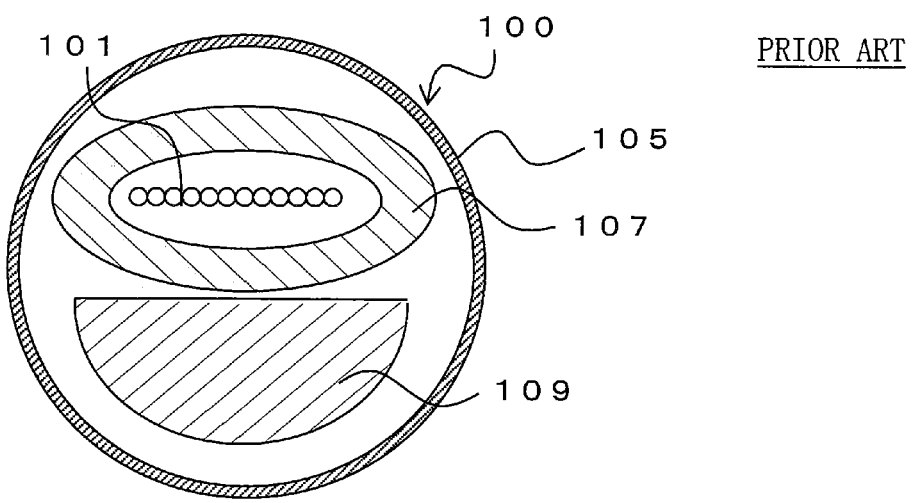
FIG. 12A is a view showing the reinforcing step for a spliced portion between the optical fiber core wires 101 using the traditional reinforcing sleeve 100, and is a cross-sectional view before shrinking.
FIG. 12B is a view showing the reinforcing step for the spliced portion between the optical fiber core wires 101 using the traditional reinforcing sleeve 100, and is an ideal cross-sectional schematic view after shrinking.
FIG. 12C is a view showing the reinforcing step for the spliced portion between the optical fiber core wires 101 using the traditional reinforcing sleeve 100, and is an actual cross-sectional schematic view after shrinking.
Figure 12:
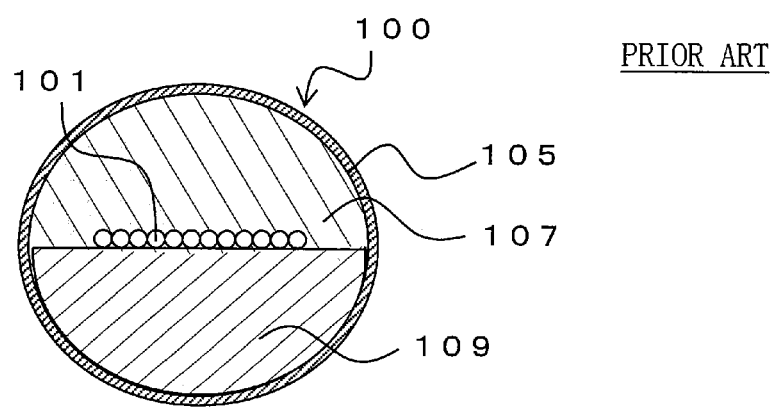
Figure 12:
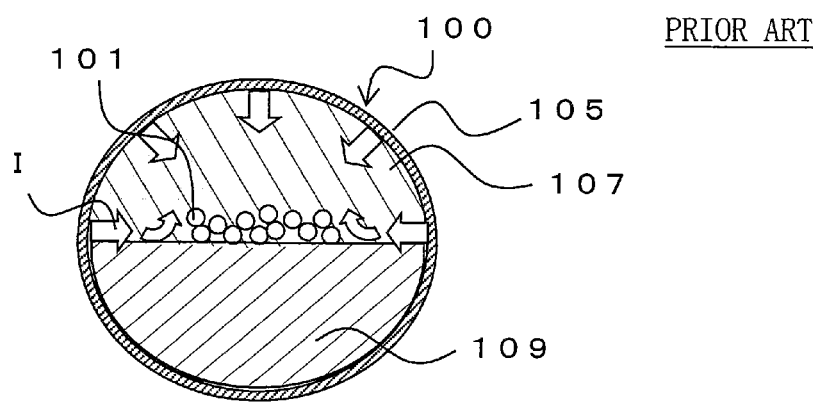

Next, a reinforcing method for an optical fiber spliced portion using the reinforcing sleeve 1 will be described. FIG. 2A and FIG. 2B are views illustrating reinforcing steps for the spliced portion between optical fiber core wires 11 forming an optical fiber tape. First, similarly to the above-mentioned FIG. 11A to FIG. 11C, outer jackets of end portions of the optical fiber core wires 11 are removed for a predetermined length, and then the end portions are butted together and fusion bonded to each other. At this time, a plurality of the optical fiber core wires 11 on one side of the optical fiber core wires are inserted into the heat-meltable member 7 of the reinforcing sleeve 1, and the reinforcing sleeve 1 is put aside on the one side of the optical fiber core wires 11.

Next, as shown in FIG. 2A, the reinforcing sleeve 1 is moved so as to cover the spliced portion of the plurality of optical fiber core wires 11. Then, the heat-shrinkable tube 5 and the heat-meltable member 7 are heated to shrink the heat-shrinkable tube 5 and melt the heat-meltable member 7.

FIG. 2B is a cross-sectional view showing a state in which the heat-shrinkable tube 5 has shrunk and the heat-meltable member 7 has melted. When the heat-meltable member 7 melts, the heat-meltable member 7 flows downward along the tension member 9. At this time, with the linearly-shaped inclined portions formed on the tension member 9 on the side of the optical fiber core wires 11, the optical fiber core wires 11 also move toward the tension member 9 along with the heat-meltable member 7, and the optical fiber core wires 11 disperse toward the end portions of the width direction along the inclinations of the tension member 9. At this time, as mentioned above, the heat-meltable member 7 and the optical fiber core wires 11 disposed side-by-side receive side pressure caused by shrinking of the heat-shrinkable tube 5 (arrows B in the drawing).

As above, the optical fiber core wires 11 are dispersed on the inclined surfaces of the tension member 9, and the side pressure to each of the optical fiber core wires 11 generates force components in directions perpendicular to the inclined surfaces of the tension member 9. This can suppress floating of the optical fiber core wires 11 from the tension member 9 and prevent disarrangement. In reality, the optical fiber core wires 11 are not in contact with the tension member 9, and the heat-meltable member 7 enters into a space between the optical fiber core wires 11 and the tension member 9.

Here, the flat portion 10 is formed at the substantially center portion of the width direction of the tension member 9. As mentioned above, the side pressure from the heat-shrinkable tube 5 is larger on the end portion of the side-by-side optical fiber core wires 11. For this reason, the inclination portion with a larger angle of inclination is formed on the end portion of the side-by-side optical fiber core wires 11 so as to prevent the optical fiber core wires 11 from moving toward the center due to the side pressure.

On the other hand, an influence of the side pressure is smaller at the center portion of the tension member 9 and, at the same time, the optical fiber dispersion portion 13 can prevent the optical fiber core wires on both sides from moving closer to the center portion. Thus, deliberately forming the flat portion 10 at the proximity of the center portion of the tension member 9 can more stably arrange the optical fiber core wires 11 at the proximity of the center portion.

When the heat-meltable member 7 is completely melted and the heat-shrinkable tube 5 is completely shrunken, the heating is stopped for cooling, and then the heat-meltable member 7 unifies the tension member 9 with the spliced portion of the optical fiber core wires 11 as one body. In this way, a reinforcing structure of the spliced portion of the optical fibers using the reinforcing sleeve 1 can be obtained. That is, in the reinforcing structure of the spliced portion of the optical fibers, the heat-meltable member 7 covers the spliced portion of the optical fiber core wires 11, and the optical fiber core wires 11 forming the optical fiber tape are disposed along a surface of the tension member 9.

If the optical fiber tape is an optical fiber ribbon in which a plurality of optical fiber core wires are bonded at intervals in a longitudinal direction and adjacent bonded portions are arranged in a zigzag arrangement or in a step form in the longitudinal direction, for example, the arrangement of the optical fiber core wires 11 is likely to be disarranged due to the side pressure in particular.

Figure 3:
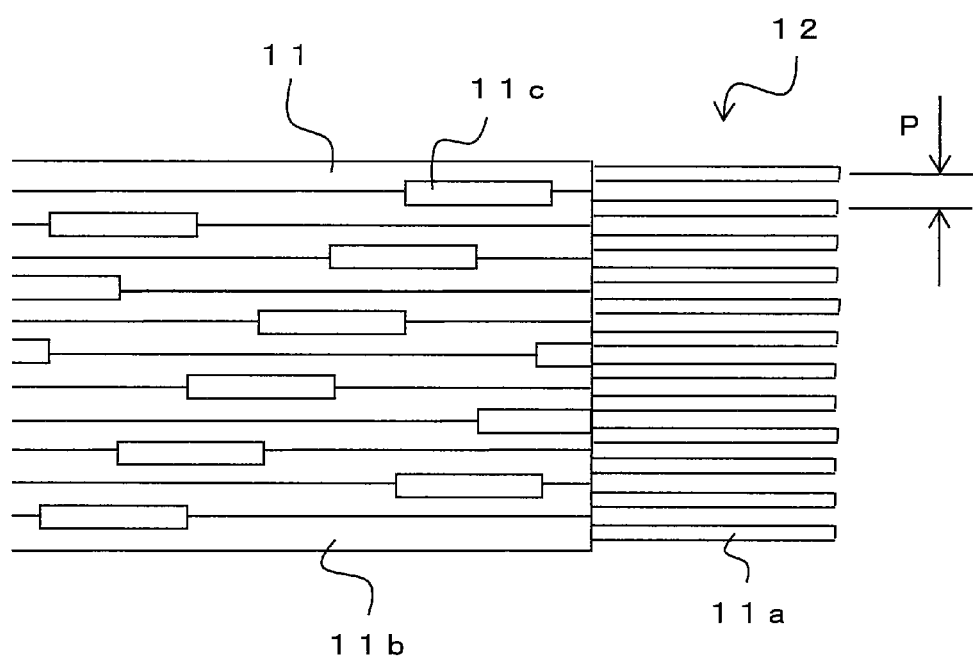
FIG. 3A is a view showing an optical fiber ribbon 12.
FIG. 3B is a view showing a state in which the optical fiber ribbons 12 are butted to each other.
Figure 3:
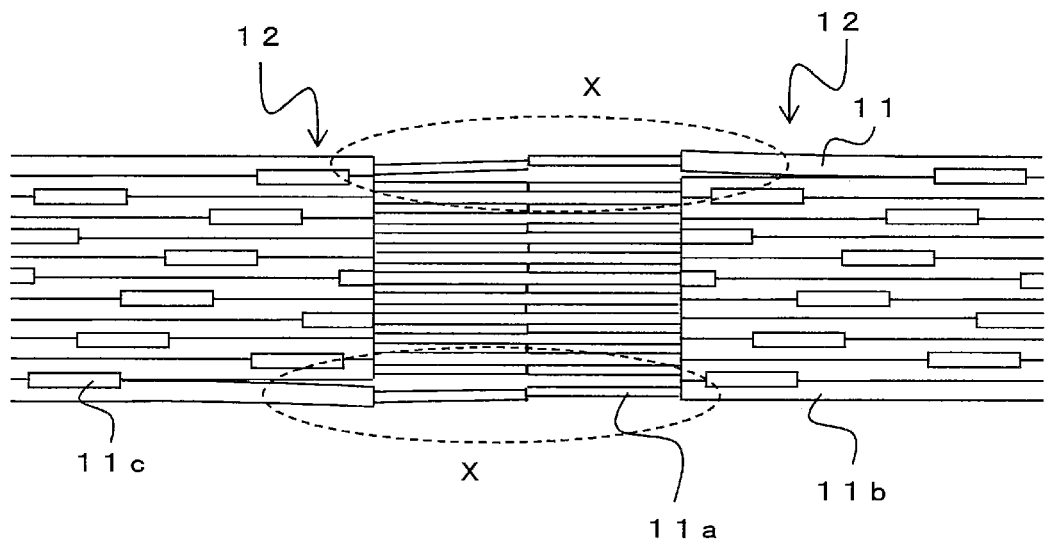

FIG. 3A is a view showing an optical fiber ribbon 12. As mentioned above, the optical fiber ribbon 12 includes the plurality of optical fiber core wires 11 that are arranged side by side and bonded at intervals in the longitudinal direction at bonding portions 11c. The optical fiber core wire 11 includes a glass fiber 11a inside and a resin coating 11b that is disposed on an outer periphery of the glass fiber 11a. The resin coating 11b at an end portion of the optical fiber core wire 11 is removed when splicing the optical fiber core wires 11. Here, a pitch P between the optical fiber core wires 11 is almost equal to an outer diameter of the optical fiber core wire 11.

FIG. 3B is a schematic view showing a state in which the optical fiber ribbons 12 are butted and fusion bonded with each other. The optical fiber ribbon 12 has intermittent bonding portions for fixing the optical fiber core wires 11 with each other. Thus, the optical fiber ribbon 12 has longer independent parts of the optical fiber core wires 11 than a traditional optical fiber tape, in which the optical fiber core wires 11 are fixed over an entire length thereof. For this reason, the arrangement of the optical fiber core wires 11 of the optical fiber ribbon 12 has higher degree of freedom, which may cause position shifting of the optical fiber core wires 11 (the glass fibers 11a) when butting the glass fibers 11a to each other (a section X in the drawing). Thus, the present embodiment is particularly effective for the intermittently bonded optical fiber ribbon in which the plurality of optical fiber core wires 11 are disposed side by side and bonded at intervals in the longitudinal direction.

Also, the disarrangement due to the side pressure is likely to occur often in a case with the optical fiber core wire 11 having the small outer diameter (the outer diameter of the resin coating 11b). Thus, the present embodiment is particularly effective in a case where each optical fiber core wire 11 forming the optical fiber tape has the outer diameter of 225

μm or less. It is further effective when the outer diameter of the optical fiber core wire is reduced to 200 μm or less, or even to 170 μm or less.

Moreover, the glass fiber 11a without the resin coating 11b traditionally has the outer diameter of 125 μm. However, if the glass fiber 11a is thinner, the rigidity of the optical fiber core wire 11 decreases, and this may cause the disarrangement of the glass fibers 11a due to the side pressure. Thus, the present embodiment is particularly effective in a case where the outer diameter of each of the glass fibers 11a forming the optical fiber tape is 110 μm or less.

Moreover, if the pitch P between the optical fiber core wires 11 is smaller than a traditional pitch of 250 μm, it is necessary to prevent the disarrangement of the optical fiber core wires 11 with certainty. Otherwise, issues such as the glass fibers 11a coming into contact with each other are likely to occur. Thus, the present embodiment is particularly effective in a case where the pitch P between the optical fiber core wires 11 is 225 μm or less. In particular, if the pitch P between the optical fiber core wires 11 is reduced to 200 μm or less, or even to 170 μm or less, the possibility of contact or intersection between the glass fibers 11a increases, and thus the present embodiment is furthermore effective.

Also, the more the number of the optical fiber core wires 11 forming the optical fiber tape is, the more likely the disarrangement of the optical fiber core wires 11 due to the side pressure occurs. Thus, the present embodiment is particularly effective in a case where the number of the plurality of optical fiber core wires 11 forming the optical fiber tape is 8 or more. The present embodiment is furthermore effective as the number of the optical fiber core wires is increased to 12 or more, 16 or more, or 24 or more.

That is, the present embodiment is remarkably effective for the intermittently bonded optical fiber ribbon having the large number of the optical fiber core wires 11, the small pitch P between the optical fiber core wires 11, and the small outer diameter of the optical fiber core wire 11.

As above, according to the first embodiment of the present invention, the optical fiber dispersion portion 13 including an inclined surface is formed at a part of the surface of the tension member 9 on the side of the optical fiber core wires 11, and this suppress disarrangement at such parts of the optical fiber core wires 11 due to the side pressure. At this time, the angle changing portion 13a where the angle of inclination changes is formed at least at a part of the inclined portion, and this enables to set appropriate angles of inclination for each of the predetermined ranges, which facilitates controlling of dispersion force in the width direction. Thus, it is possible to suppress a variation in transmission loss in each of the optical fiber core wires 11.

In particular, by forming the linearly-shaped inclined portion, it is possible to control more easily the dispersion force of the optical fiber core wires in the width direction. The angle changing portion 13a may exist not only between linearly shaped inclined portions but also between curves or between a curve and a straight line, where the angle of inclination is discontinuous (including where the angle of inclination is 0°).

Also, the flat portion 10 is formed in a predetermined range of the substantially center portion of the width direction of the tension member 9, and this can stabilize the arrangement of the optical fiber core wires 11 at the center portion.

Second Embodiment

Figure 4:
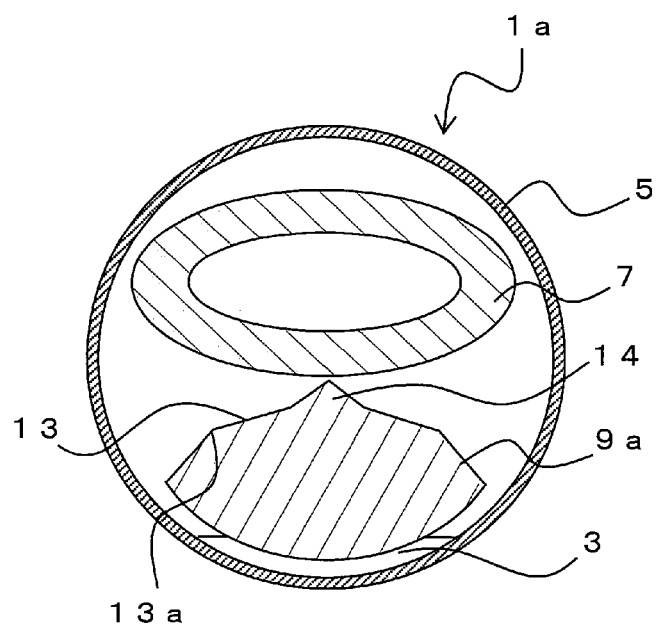
Figure 4:
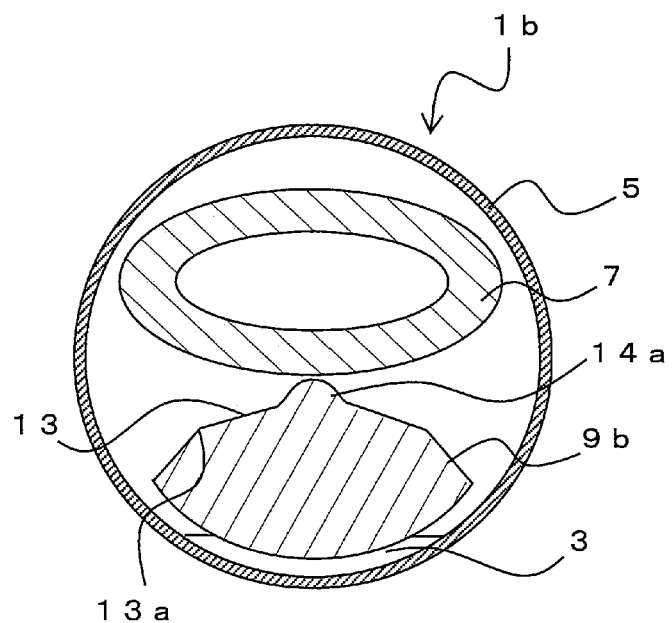

Next, a second embodiment of the present invention will be described. FIG. 4A is a cross-sectional view of a reinforcing sleeve 1a. In the descriptions hereafter, structures having the same functions as in the reinforcing sleeve 1 will have the same notations as in FIG. 1A to FIG. 3C, and redundant descriptions will be omitted.

The reinforcing sleeve 1a has approximately the same structure as the reinforcing sleeve 1 except that a tension member 9a is used. The tension member 9a includes, in place of the flat portion 10, a convex portion 14 protruding upward (toward the heat-meltable member 7). The convex portion 14 is formed at a substantially center portion of a width direction of the tension member 9a. The convex portion 14 is formed of linearly-shaped inclined surfaces pointing upward.

As shown in FIG. 4B, a reinforcing sleeve 1b using a tension member 9b may also be used. The tension member 9b includes a convex portion 14a protruding upward (toward the heat-meltable member 7). The convex portion 14a is formed at a substantially center portion of a width direction of the tension member 9b. The convex portion 14 is formed of curved inclined surfaces pointing upward. The convex portion may be formed of linearly-shaped inclined surfaces or of protruding curved surfaces. In either case, the optical fiber dispersion portion 13, which is a linearly-shaped inclined surface, is formed on each side of the convex portion 14 or 14a.

Figure 5:
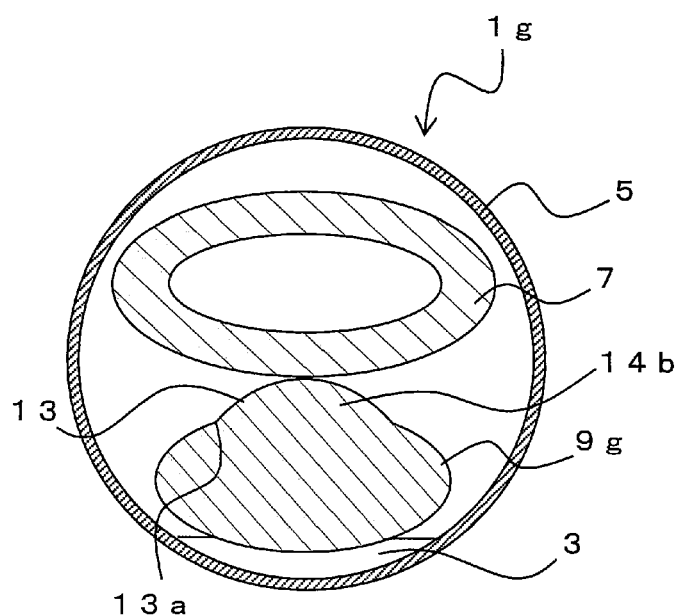
FIG. 5 is a cross-sectional view of a reinforcing sleeve 1g.

Alternatively, a reinforcing sleeve 1g shown in FIG. 5 using a tension member 9g may be used. The tension member 9g includes a convex portion 14b protruding upward (toward the heat-meltable member 7). The convex portion 14b is formed at a substantially center portion of a width direction of the tension member 9g. Each side in a width direction of the convex portion 14b has another curved surface (a curved convex surface pointing upward (toward the heat-meltable member 7)) continuing via an angle changing portion 13a. That is, all parts of the optical fiber dispersion portion 13, except at the angle changing portion 13a, are formed of curved convex surfaces protruding toward the heat-meltable member 7.

When reinforcing the spliced portion of the optical fiber core wires using the reinforcing sleeve 1a, 1b or 1g, the convex portion 14, 14a, or 14b divides the side-by-side optical fiber core wires 11 at the substantially center portion of the optical fiber core wires 11 to both sides. At this time, even if the optical fiber core wires 11 receive the side pressure, force components are generated to the optical fiber core wires 11 in directions perpendicular to the convex portion 14, 14a, or 14b. This can suppress floating of the optical fiber core wires 11 from the tension member 9 and prevent disarrangement.

According to the second embodiment of the present invention, the same effects as in the first embodiment can be obtained. Forming the convex portion 14, 14a, or 14b at the substantially center portion of the width direction of the tension member as above can suppress disarrangement of the optical fiber core wires 11. Also, the optical fiber dispersion portion 13 may not include linear parts as in the reinforcing sleeve 1g, and may be formed of curved convex surfaces protruding toward the heat-meltable member 7 except at the angle changing portion 13a.

Third Embodiment

Figure 6:
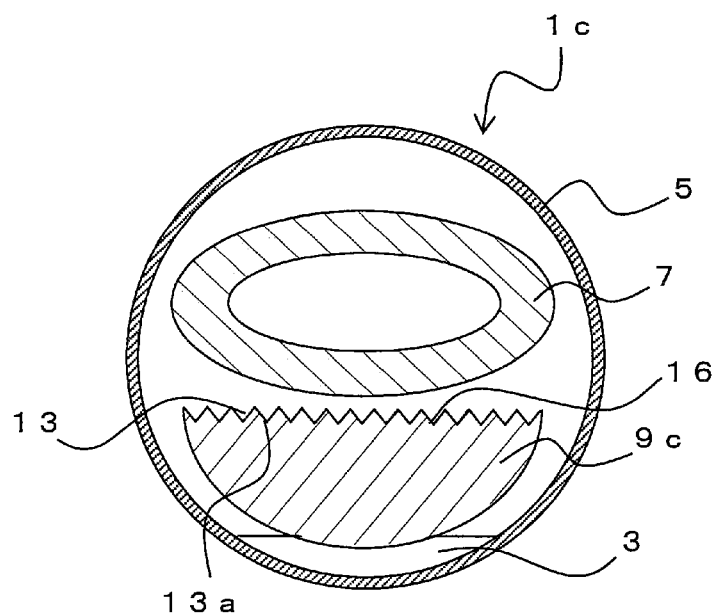
FIG. 6A is a cross-sectional view of a reinforcing sleeve 1c.
FIG. 6B is a cross-sectional view of a reinforcing sleeve 1d.
Figure 6:
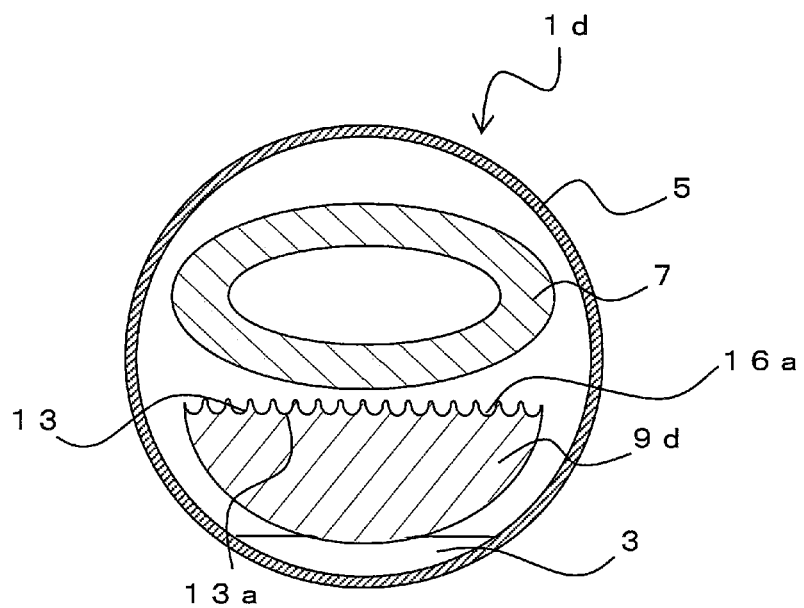

Next, a third embodiment will be described. FIG. 6A is a cross-sectional view of a reinforcing sleeve 1c. The reinforcing sleeve 1c has approximately the same structure as the reinforcing sleeve 1 except that a tension member 9c is used. The tension member 9c includes a groove 16 formed on at least a part of a surface on the side of the heat-meltable member 7 along a longitudinal direction of the tension member 9c. The groove 16 is formed of a plurality of V-shaped grooves. In such the case, an inclined surface on each side of the groove 16 functions as the optical fiber dispersion portion 13.

A reinforcing sleeve 1d using a tension member 9d shown in FIG. 6B may also be used. The tension member 9d includes a groove 16a formed on at least a part of a surface on the side of the heat-meltable member 7 along a longitudinal direction of the tension member 9d. The groove 16a includes a groove-shaped top part and an arc-shaped bottom part. As above, the shape of the groove may not be entirely linear. In the present embodiment, the optical fiber dispersion portion 13 at least partly including linear parts is defined to be formed of linear parts even if a part of the optical fiber dispersion portion 13 is formed of curves. In the descriptions hereafter, an example using the reinforcing sleeve 1c that includes the groove 16 will be described. However, in either case, a part where a direction of a curvature changes, such as the bottom part of the groove, is defined as an angle changing portion 13a.

Figure 7:
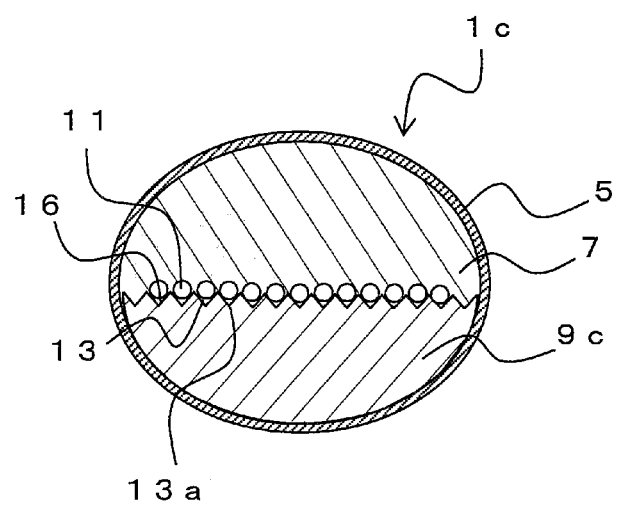
FIG. 7 is a cross-sectional view of the reinforcing sleeve 1c after shrinking.

FIG. 7 is a cross-sectional view showing a state in which the reinforcing sleeve 1c is shrunk. A pitch of the groove 16 is greater than the outer diameter of the subjected optical fiber core wire 11. When the spliced portion of the optical fiber core wires is reinforced by using the reinforcing sleeve 1c and the heat-meltable member 7 flows down from an upper part, each of the optical fiber core wires 11 settles down into the groove 16. Thus, when the optical fiber core wires 11 receive some side pressure, force components in directions perpendicular to side faces of the groove 16 are generated. This can suppress floating of the optical fiber core wires 11 from the tension member 9 and prevent disarrangement.

Figure 8:
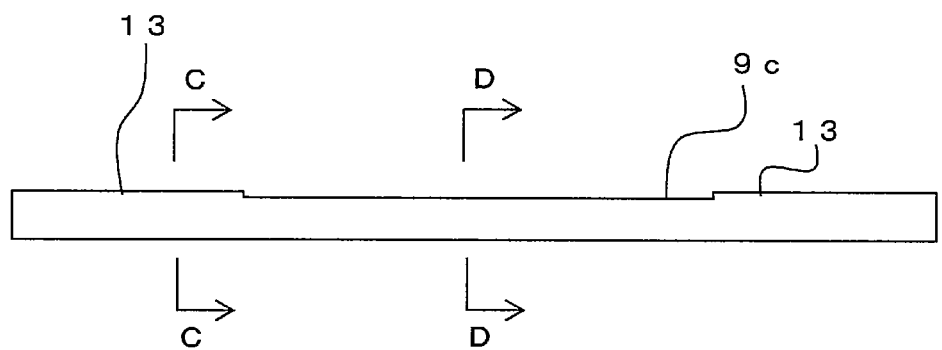
FIG. 8A is a side view of a tension member 9c.
FIG. 8B is a cross-sectional view taken along C-C line in FIG. 8A.
FIG. 8C is a cross-sectional view taken along D-D line in FIG. 8A.
Figure 8:
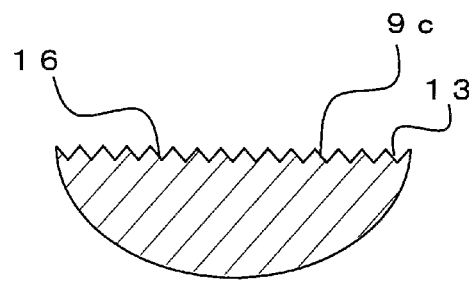
Figure 8:
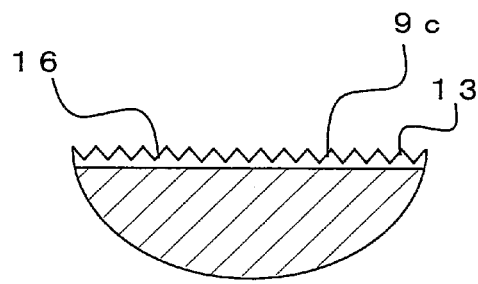

Here, the groove 16 may be formed over an entire length of the tension member 9c, or may be formed at a part of a longitudinal direction thereof. FIG. 8A is a side view of the tension member 9c, FIG. 8B is a cross-sectional view taken along C-C line in FIG. 8A, and FIG. 8C is a cross-sectional view taken along D-D line in FIG. 8A. As shown in the drawings, in the longitudinal direction of the tension member 9c, the groove 16 is formed only in a predetermined range in proximity of each end portion, and not in a predetermined range in proximity of a substantially center portion.

A thickness of a part where the groove 16 is formed is larger than a thickness of a part where the groove 16 is not formed (a flat portion). That is, a height position of the part where the groove 16 is formed is higher than a height position of the part where the groove 16 is not formed. As mentioned above, when splicing the optical fiber core wires 11 together, the resin coating is removed, exposing the glass fibers inside. At this time, if the glass fibers come into contact with the groove 16, edges or the like of the groove 16 may damage the glass fibers.

For this reason, the groove 16 is formed at parts where the resin coating of the optical fiber core wires 11 is present, and is not formed at parts where the glass fibers are exposed. In this way, the glass fibers can be disposed on the flat portion. As above, by making the thickness of the flat portion of the tension member 9c less than the thickness of the bottom part of the groove 16 (the thinnest part), it is possible to avoid the contact between the glass fibers and the groove 16 of the tension member 9c.

As above, the groove 16 is formed only on each end portion of the tension member 9c in the present embodiment. However, this is also applicable to the tension members 9, 9a, and 9b. That is, the optical fiber dispersion portion 13 may be formed only on each end portion of the tension member in the longitudinal direction, and not in the predetermined range of the substantially center portion of the longitudinal direction of the tension member. In addition, the same effects can be obtained by making the height position of the optical fiber dispersion portion 13 of the tension member on the side of the heat-meltable member 7 higher than the height position of the tension member on the side of the heat-meltable member 7 in the predetermined range at the substantially center portion of the longitudinal direction of the tension member 9 (the flat portion).

According to the third embodiment, the same effects as in the first embodiment can be obtained. As above, the optical fiber dispersion portion 13 may groove shaped. Also, by forming the optical fiber dispersion portion 13 on each end portion of the longitudinal direction of the tension member, damages to the glass fibers can be prevented.

Fourth Embodiment

Figure 9:
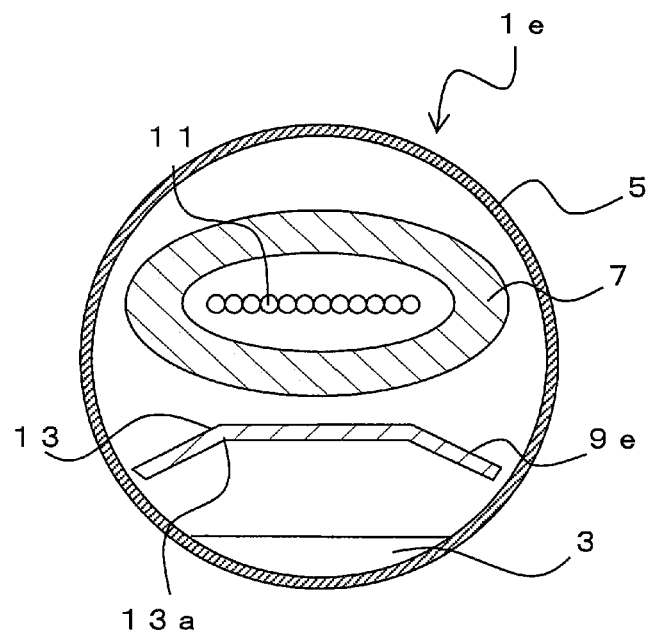
FIG. 9A is a view showing a reinforcing step for the spliced portion between optical fiber core wires 11 using a reinforcing sleeve 1e, and is a cross-sectional view before shrinking.
FIG. 9B is a view showing the reinforcing step for the spliced portion between the optical fiber core wires 11 using the reinforcing sleeve 1e, and is a cross-sectional view after shrinking.
Figure 9:
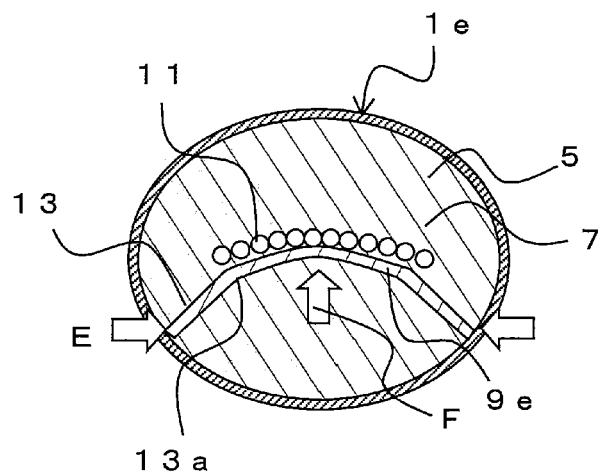

Next, a fourth embodiment will be described. FIG. 9A is a cross-sectional view of a reinforcing sleeve 1e. The reinforcing sleeve 1e has approximately the same structure as the reinforcing sleeve 1 except that a tension member 9e is used. The tension member 9e is plate shaped, and each end portion of the tension member 9e includes a bending portion bending toward a direction moving away from the heat-meltable member 7. That is, in the tension member 9e, an inclined portion in proximity of each end portion is the optical fiber dispersion portion 13.

FIG. 9B is a view showing a state in which the heat-meltable member 7 has melted and the heat-shrinkable tube 5 has shrunk. When the heat-shrinkable tube 5 shrinks, shrinking force of the heat-shrinkable tube 5 (E in the drawing) deforms the tension member 9e into a shape protruding toward the heat-meltable member 7. That is, the tension member 9e is elastically deformable.

As above, the elastically deformable tension member 9e with proximity of both end portions being bent toward an opposite side of the heat-meltable member 7 is used so that, after shrinking the heat-shrinkable tube 5, the tension member 9e can be deformed into the shape protruding upward (toward the heat-meltable member 7). In this way, a substantially center portion of a width direction of the tension member 9e (between the bending portions) can protrude upward to form inclined portions, and also an inclined portion with a different angle of inclination can be formed on each side of the angle changing portion 13a. Thus, when the heat-meltable member 7 melts and the heat-shrinkable tube 5 shrinks, it is possible to suppress floating of the optical fiber core wires 11 from the tension member 9e and prevent disarrangement.

Figure 10:
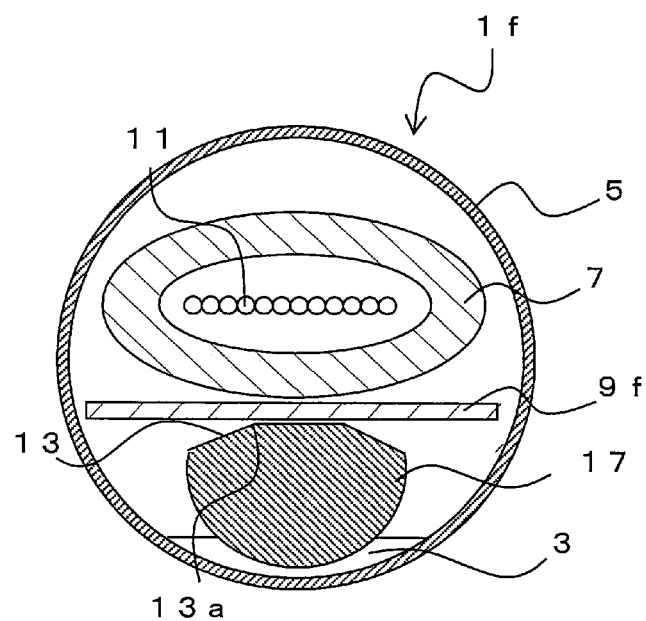
FIG. 10A is a view showing a reinforcing step for the spliced portion between optical fiber core wires 11 using a reinforcing sleeve 1f, and is a cross-sectional view before shrinking.
FIG. 10B is a view showing the reinforcing step for the spliced portion between the optical fiber core wires 11 using the reinforcing sleeve 1f, and is a cross-sectional view after shrinking.
Figure 10:
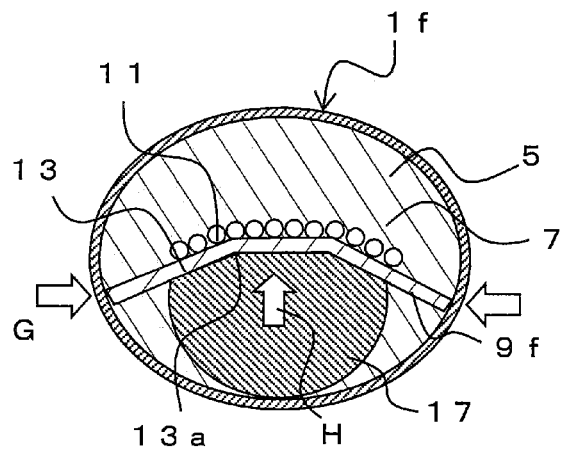

For further stabilization of the shape of the tension member after the deformation, a reinforcing sleeve if shown in FIG. 10A may also be used. The reinforcing sleeve if includes a plate-shaped tension member 9f, which is a first tension member, and a tension member 17, which is a second tension member. The tension member 17 is disposed on a side of the tension member 9f that is opposite to the heat-meltable member 7.

The plate-shaped tension member 9f is elastically deformable. Also, the tension member 17 has a shape protruding upward (toward the heat-meltable member 7). In more details, the optical fiber dispersion portion 13 including linearly-shaped inclined portions is formed on an upper surface of the tension member 17.

FIG. 10B is a view showing a state in which the heat-meltable member 7 has melted and the heat-shrinkable tube 5 has shrunk. When the heat-shrinkable tube 5 shrinks, shrinking force of the heat-shrinkable tube 5 (G in the drawing) deforms the tension member 9f. At this time, the tension member 9f deforms into a shape corresponding to a shape of the upper surface of the tension member 17, which is disposed at a lower part of the tension member 9f. Thus, the tension member 9f is in a shape protruding toward the heat-meltable member 7.

By deforming the tension member 9f into the shape protruding upward (toward the heat-meltable member 7) in this way after shrinking the heat-shrinkable tube 5, it is possible to suppress floating of the optical fiber core wires 11 from the tension member 9f and to prevent disarrangement when the heat-meltable member 7 melts and the heat-shrinkable tube 5 shrinks.

According to the fourth embodiment, the same effects as in the first embodiment can also be obtained. Elastically deforming the tension member to form the inclined surfaces on the surface of the tension member on the side of the optical fiber core wires 11 in this way can suppress disarrangement of the optical fiber core wires 11.

Although the preferred embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

DESCRIPTION OF NOTATIONS 1, 1a, 1b, 1c, 1d, 1e, 1f, 1g . . . reinforcing sleeve
3 . . . rivet-head portion
5 . . . heat-shrinkable tube
7 . . . heat-meltable member
9, 9a, 9b, 9c, 9d, 9e, 9f, 17 . . . tension member
10 . . . flat portion
11 . . . optical fiber core wire
11a . . . glass fiber
11b . . . resin coating
11c . . . bonding portion
12 . . . optical fiber ribbon
13 . . . optical fiber dispersion portion
13a . . . angle changing portion
14, 14a, 14b . . . convex portion
16, 16a . . . groove
100 . . . reinforcing sleeve
101 . . . optical fiber core wire
103 . . . electrode
105 . . . heat-shrinkable tube
107 . . . heat-meltable member
109 . . . tension member

What is claimed is:

1. A reinforcing sleeve for collectively reinforcing spliced portions of a plurality of optical fiber core wires disposed side by side, the reinforcing sleeve comprising:
a heat-shrinkable tube;
a heat-meltable member; and
a tension member, the heat-meltable member and the tension member being inserted into the heat shrinkable tube, wherein the tension member includes an optical fiber dispersion portion formed at least at a part of a longitudinal direction of the tension member on a surface of the tension member on a side of the heat-meltable member;
the optical fiber dispersion portion includes an inclined portion that is formed so as to separate away from the heat-meltable member as being closer to an end portion of a width direction in a cross section perpendicular to the longitudinal direction of the tension member; and
at least a part of the inclined portion includes an angle changing portion at which an angle of inclination changes.

2. The reinforcing sleeve according to claim 1, wherein the optical fiber dispersion portion includes a linearly-shaped inclined portion that separates away from the heat-meltable member as being closer to the end portion of the width direction in the cross section perpendicular to the longitudinal direction of the tension member.

3. The reinforcing sleeve according to claim 1, wherein a flat portion is formed at a substantially center portion of the width direction of the tension member.

4. The reinforcing sleeve according to claim 1, wherein a convex portion protruding upward is formed at a substantially center portion of the width direction of the tension member.

5. The reinforcing sleeve according to claim 1, wherein a groove is formed on at least a part of the surface of the tension member on the side of the heat-meltable member.

6. The reinforcing sleeve according to claim 1, wherein the optical fiber dispersion portion is not formed in a predetermined range at a substantially center portion of the longitudinal direction of the tension member, and a height position of the tension member on the side of the heat-meltable member at the optical fiber dispersion portion is higher than a height position of the tension member on the side of the heat-meltable member in the predetermined range at the substantially center portion of the longitudinal direction of the tension member.

7. The reinforcing sleeve according to claim 1, wherein the tension member is plate shaped; and
the tension member is elastically deformable so that shrinking force of the heat-shrinkable tube can deform the tension member into a convex shape protruding toward the heat-meltable member.

8. The reinforcing sleeve according to claim 7, wherein the tension member comprises a first tension member having a plate shape and a second tension member that is disposed on a side of the first tension member being opposite to the heat-meltable member, and the second tension member is in a protruding shape protruding toward the first tension member.

9. A reinforcing structure of a spliced portion of an optical fiber using the reinforcing sleeve according to claim 1, wherein the heat-meltable member covers the spliced portion of optical fiber ribbons, each of the optical fiber ribbons comprising a plurality of optical fiber core wires that are placed side by side and bonded to each other at intervals in a longitudinal direction of the optical fiber ribbons.

10. The reinforcing structure of the spliced portion of the optical fiber according to claim 9, wherein the number of the plurality of optical fiber core wires forming each of the optical fiber ribbons is 12 or more.

11. The reinforcing structure of the spliced portion of the optical fiber according to claim 9, wherein a pitch between the plurality of optical fiber core wires is 200 μm or less.

12. The reinforcing structure of the spliced portion of the optical fiber according to claim 9, wherein an outer diameter of a glass fiber of each of the plurality of optical fiber core wires is 110 µm or less.

13. The reinforcing structure of the spliced portion of the optical fiber according to claim 9, wherein an outer diameter of each of the plurality of optical fiber core wires is 200 µm or less.

* * * * *